May 3, 1938.   W. G. PONTIS   2,116,158
FISHING ROD HANDLE
Filed Dec. 29, 1937   3 Sheets-Sheet 1

INVENTOR
WILLIAM G. PONTIS
BY
Russell C. Lane
ATTORNEY

May 3, 1938. W. G. PONTIS 2,116,158
FISHING ROD HANDLE
Filed Dec. 29, 1937 3 Sheets-Sheet 2

INVENTOR
WILLIAM G. PONTIS
BY
Russell C. Lane
ATTORNEY

May 3, 1938.　　　　W. G. PONTIS　　　　2,116,158
FISHING ROD HANDLE
Filed Dec. 29, 1937　　　3 Sheets-Sheet 3
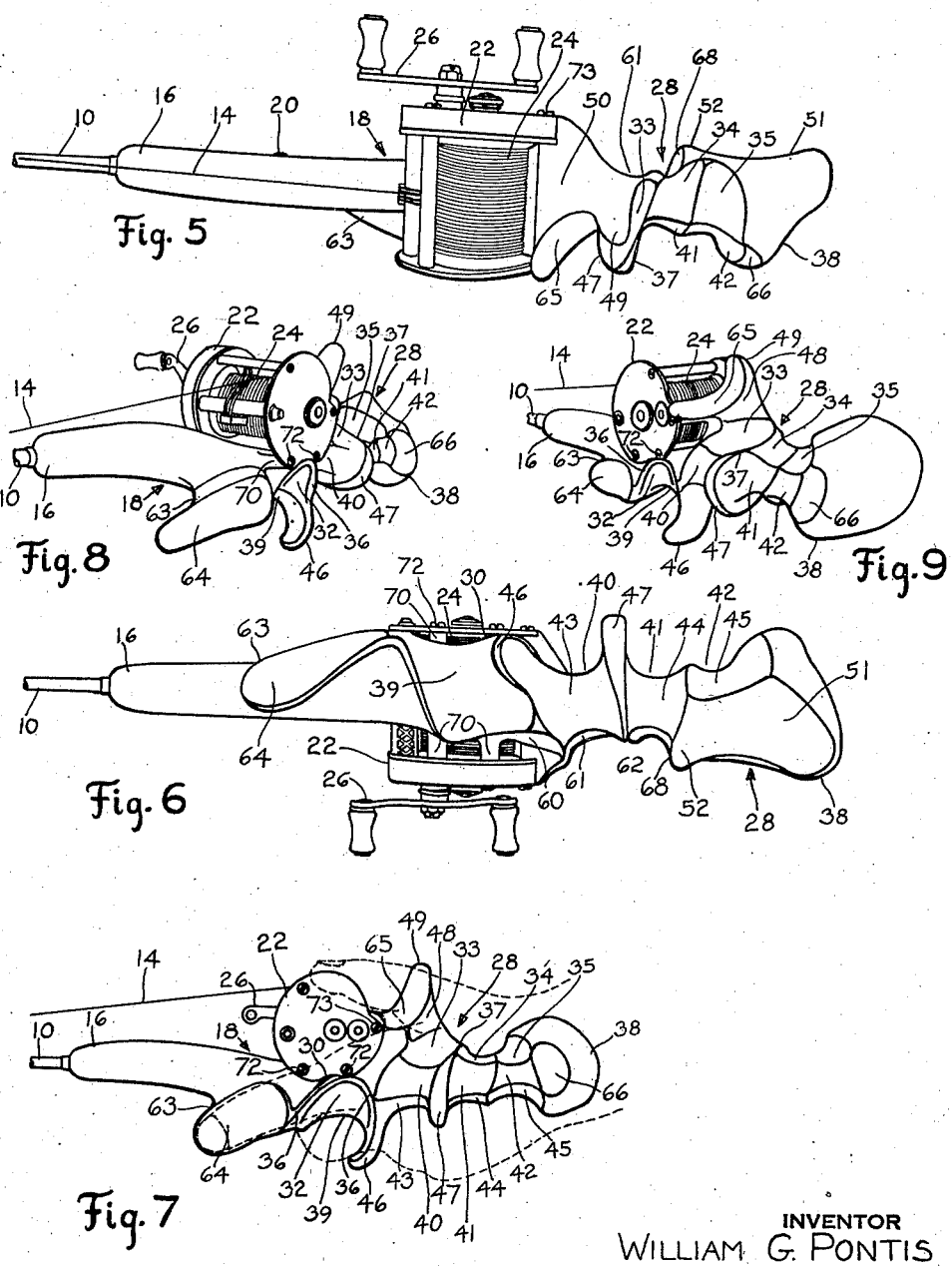
INVENTOR
WILLIAM G. PONTIS
BY
Russell C. Lane
ATTORNEY Patented May 3, 1938

2,116,158

UNITED STATES PATENT OFFICE 2,116,158

FISHING ROD HANDLE

William G. Pontis, Dayton, Ohio

Application December 29, 1937, Serial No. 182,216

14 Claims. (Cl. 43—23)

This invention relates to fishing equipment, and has reference to an improved handle member for fishing rods, and particularly for casting rods, by which a natural and comfortable retention of the rod is had at all times while maintaining a secure hold, and fully sensitive control of the implement.

It is an object of the invention to provide a handle member for fishing rods, and like devices adapted for mounting actuatable units thereon, which handle will fit naturally within the clasped hand of the user, whether it be the right or left hand, and afford complete and sensitive control of the actuatable units or devices attached to the handle.

A further object is to provide a handle member for a fishing rod, with provision for accurately locating the parts of either right or left hand, to best advantage for positive control of the rod, reel and line, without fatigue to the holding hand, though exercised over a long period of time.

A further object is to provide a form fitting handle for fishing rods, of a versatile nature in that it naturally fits the maximum area of irregular control of either the right or left hand of the user, by which the forces exerted by the several hand parts are applied at the most advantageous points on the rod handle for complete control and manipulation of the rod, and reel, if mounted thereon.

A specific object of the invention is to provide a handle member of rigid construction for a casting rod, so contoured as to fit naturally into the irregularities of the clasped hand by which the rod is to be held, but adapted to be shifted at the option of the user to the other hand, where it will fit naturally with substantially equal comfort and equal engaging hand area, thereby insuring the user of absolute and complete control of the rod under any condition.

A still further object is to provide a handle member for a fishing rod that takes into account the inherent weakness of various parts of the holding hand, by appropriate distribution of the various components of the hand's holding force, thereby accomplishing a perfect balance of power applied to the handle, and resulting in efficient and assured control of the rod throughout all of the manipulations incident to a day's fishing.

A still further object is to provide a handle for a fishing rod, that will permit of a relaxed but secure grip of the rod, without the usual exertion of a tight muscular grip, that is practically necessary with rod handles of the conventional form, in order to retain possession of the rod when a vigorous strike is made or when the line catches on an obstruction.

Another object is to provide a form fitting handle contoured for ambidexter holding, and having particular provisions for improving the technique with which a user is able to manipulate the attached unit under all conditions, and to design a form fitting handle member of rigid construction that may be either cast, molded or otherwise fabricated by processes characterized by the use of a simple two part mold fixture.

Further objects and advantages of the present invention will be apparent from the following description, reference being had to the accompanying drawings wherein a preferred embodiment of the present invention is clearly shown.

In the drawings:

Fig. 5 is a view of the handle and rod assembly, viewing the same from a point on the side of the reel seat, and substantially as indicated by the arrow 5 in Fig. 1.

Fig. 6 is a view of the handle and rod assembly from a point on the opposite side of the reel seat, substantially as indicated by the arrow 6 in Fig. 1.

Fig. 7 is a view on reduced scale looking at the back of the left hand in its holding position upon the handle.

Fig. 8 is a perspective view of one side of the handle, looking at it from a point near the rod tip.

Fig. 9 is a perspective view of the same, but looking at it from a point to one side of the handle butt.

Figure 1:
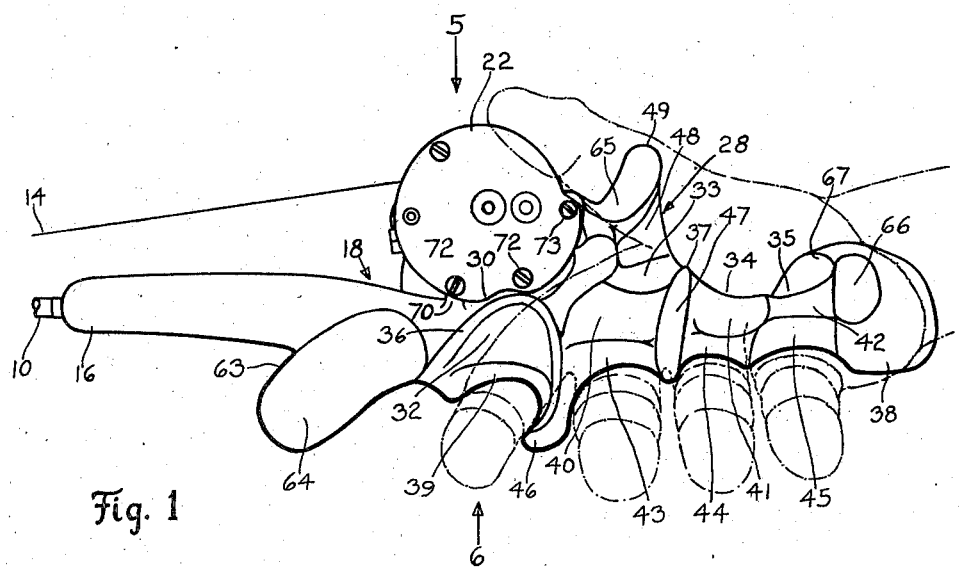
Fig. 1 is an elevational view of one side of my improved handle, with rod, reel and line attached, and positioned in the open palm of the right hand, preparatory to closing about the same.

In the art of fishing, especially with the casting rod, with an artificial lure, landing the catch depends much upon the technique of the rodster or the fisherman. Handling the rod during the casts of the lure, manipulation of the line and lure, and making the strike, calls into immediate action all of the skill and ability of the rodster. Control of the fishing rod for the various functions is administered through a flexible and active wrist, and by forces applied to the rod handle through the thumb, fingers and other parts of the holding hand. The fisherman is usually constantly in motion with his rod either in casting his line or lure, retrieving the same, striking, or in landing his catch. An unnatural grip or holding of the rod fitted with the conventional handle soon fatigues the hand and arm, and results in a relaxed and insecure retention of the rod.

The conventional fishing rod handle is principally fashioned for convenience of manufacture, and by reason of that, the rodster must be satisfied with a holding engagement of the handle that is unnatural to the clasped holding hand. In order to maintain a secure hold of a fishing rod equipped with the prior art handles, and accomplish any degree of control of the rod, a tight muscular grip on the handle must be maintained at all times, else a strike of the catch at an interval when the rod is being held with a relaxed grip may penalize the rodster with the loss of his entire rod and line.

The objections inherent in the prior art devices have been overcome, and the objects herein stated have been accomplished by fashioning a fishing rod handle that fits the natural contour of the closed holding hand, and provides means that positively and definitely locates the various hand parts for the greatest advantage, and affords complete and continued control of the rod throughout a day's fishing. There is but one way to hold the handle, and that is the right way. I provide a grip member that has seating portions for the fingers, thumb and other hand parts of the clasping hand, with attached lugs, fins or horns, that engage partially around or between certain of the fingers and parts of the holding hand for receiving torque pressure in manipulation of the rod, for preventing dispossession of the rod, and for affording accurate and sensitive control of a running line. The butt of the grip member is provided with areas for engaging the heel portion of the hand, and about which the rod fulcrums or pivots in many of the important movements. The contour of the handle takes into account the inherently strong and weak portions of the hand, and distributes the strongest components of the holding force to the points of greatest advantage, and combines the weakest components of the holding force and locates their application to a point of greatest efficiency.

While the handle is contoured to provide for a natural curving of the hand parts in holding the rod, and while it is designed for, and is intended to be used for a single hand holding of the rod, it is of the ambidexter class, in that it is adapted to fit naturally into either the right hand or the left hand, and in so doing establishes a contact with the most sensitive parts of either hand, which assures the rodster of immediate perception of what may be taking place at the tip end of the rod, or at the end of the line.

With particular reference to the drawings, 10 refers to the usual rod, equipped with the guides or rings through which is threaded the line 14. The rod 10 is secured or socketed in one end 16 of a handle member generally indicated at 18 by means of a screw or like device 20, and mounted on the handle 18 in any desired manner is a line reel 22, adapted to carry a supply of line substantially as indicated at 24. A crank 26 having appropriate driving connection with the reel drum operates to wind thereon the excess of line 14.

Figure 2:
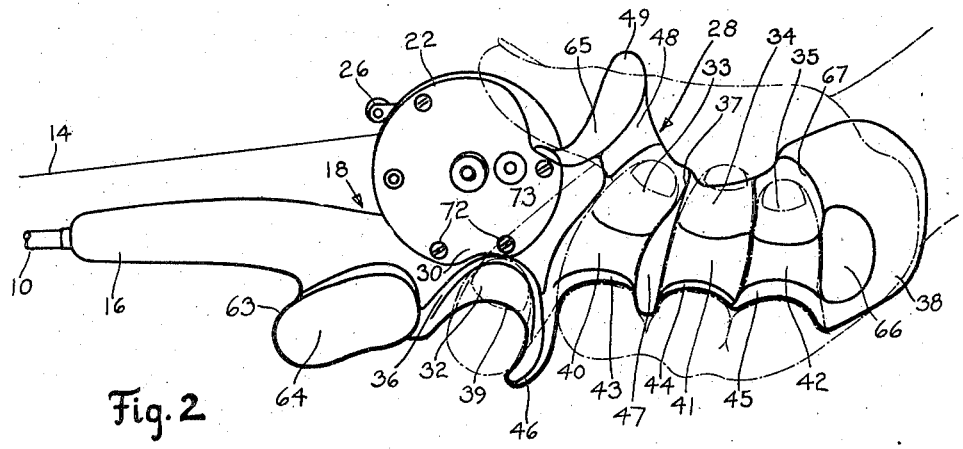
Fig. 2 is a view similar to Fig. 1, but illustrating the right hand closed in natural holding relation upon the handle.

The handle 18, is of cast, molded or other rigid construction, and has an irregular shaped grip portion 28 posterior to a reel seat 30, for seating the parts of either hand in the most natural position. With respect to the right hand, and as shown in Figs. 1 and 2 of the drawings, the contour of the grip comprises depressions, recesses, or shallow notches 32, 33, 34 and 35, adapted to receive or seat the tips or first phalanges of the fingers. Certain of these finger tip seats are segregated from others, to the extent that the finger seat 32 is located subtantially opposite the reel 22, and has about its edge an upstanding rim 36 which provides something like a pocket for reception of and definitely locating the first phalange of the right hand index finger. A ridge 37 extends up from the grip between the finger seats 33 and 34 which definitely locates the first phalange of the right hand middle finger substantially on the same side of and just to the rear of the line reel. Due to the placement of the finger seats 32 and 33, provision is made for applying the clasping force of the two strongest fingers, the index and middle finger, at points where they will be of greatest efficiency. The little and ring finger being the weakest members, provision is made for combining their clasping force at a point near the butt 38 of the handle, in that the finger seats 34 and 35 merge together with but little intervening rise.

Other placement portions, on the grip member include the shallow grooves or notches 39, 40, 41 and 42 transverse to the body of the member, that are adapted to engage the second phalange of the closed fingers, and the connecting notches 43, 44 and 45 adapted to receive or engage the third phalanges of the middle, ring and little finger respectively, of the right hand. Thus, three series of concave facets, generally aligned along the grip member are connected in something like a shallow groove extending at least partially around the handle member for nesting the major portion of each finger. That alone provides a relatively sure and non-slip retention of the handle, in that the engaging area of the hand is increased over that of the conventional handle, since the grip member follows the irregular contour, and substantially fills the space within the hand when it is closed in a natural position.

In order that a more relaxed clasp of the handle may be had, and at the same time assure the rodster that he will not be accidentally dispossessed of the rod, provisions are made for finger locks or retainers that prevent the rod being jerked from the unwary hand. One such finger lock is embodied in the lateral extension 46, disposed on the side of the handle substantially opposite to the reel 22, and curved downwardly and toward the tip of the rod so as to extend between the first and second finger of the right hand and partially surround the index finger in the region of the second phalange. The edge portion of this extension 46 may be a continuation of or joined to the ridge 36. This hook like extension also performs an important function when the back stroke is made preparatory to casting the lure upon the water, for in suddenly stopping the rod at the end of the back stroke, there is a decided pivoting of the rod over the second phalange of the index finger, which is here positioned in front of the hooked extension 46.

Another locking provision is embodied in the fin 47 that amounts to a circumferential extension of the ridge 37, partially surrounding the grip member and to extend between, and engage the adjacent surfaces of the first, second and third phalanges of the second and third fingers of the right hand. This fin, like all of the other grip extensions is integrally formed with the main portion of the grip member, and in this specific instance forms a separator between the finger seat portions 33, 40 and 43 on the one side, and the portions 34, 41 and 44 on the other side. Both of the parts 46 and 47 perform a similar function for both the right and left hand, as will be presently seen, under that part hereof devoted to the description of the left hand location.

Upstanding from the body of the grip portion is an extension or horn 48 ending in a thumb placement guard 49, near the base of which there is on one side a rounded hollow surface 50 adapted to support the second phalange of the right hand thumb. The horn 48 is positioned just to the rear of the reel 22 and acts as a thumb rest, so that the first phalange of the thumb is always free to flex and to be in controlling relation with the reel drum or the line wound thereon, which is so necessary in making an accurate cast of the bait.

Since much of the technique in handling the casting rod, depends upon wrist movement, the grip portion of the handle is fashioned at the butt 38 to provide a broad area 51 adapted to engage the heel of the palm of the right hand. The part 51 is prolonged toward the base of the reel 22 to a point about opposite the finger seat 41, to provide a portion 52 acting as a center palm support for the right hand. A flattened ridge 53 extending along the body of the grip between the portion 52 and the edge of the hook-like extension 46 continues the palm engaging area to substantially the base of the right index finger.

Figure 3:
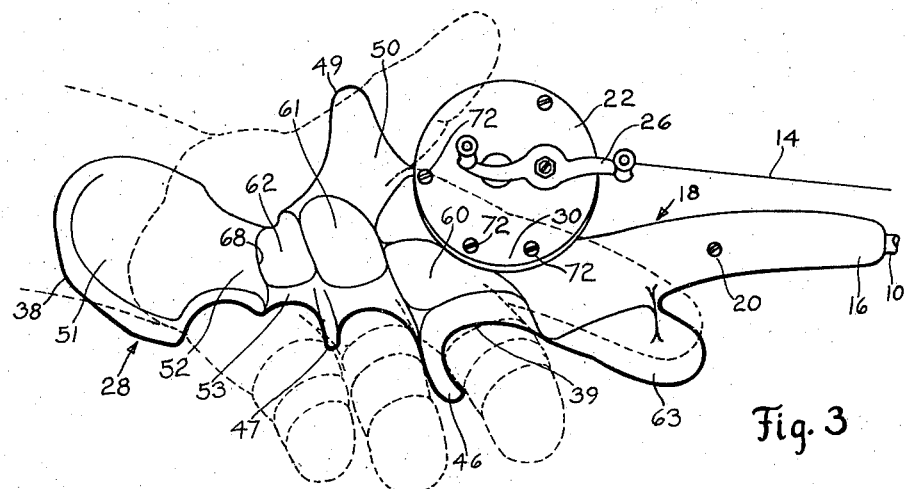
Fig. 3 is an elevational view of the opposite side of my improved handle, with the open left hand shown in the background, in a position ready to be closed about the handle.
Figure 4:
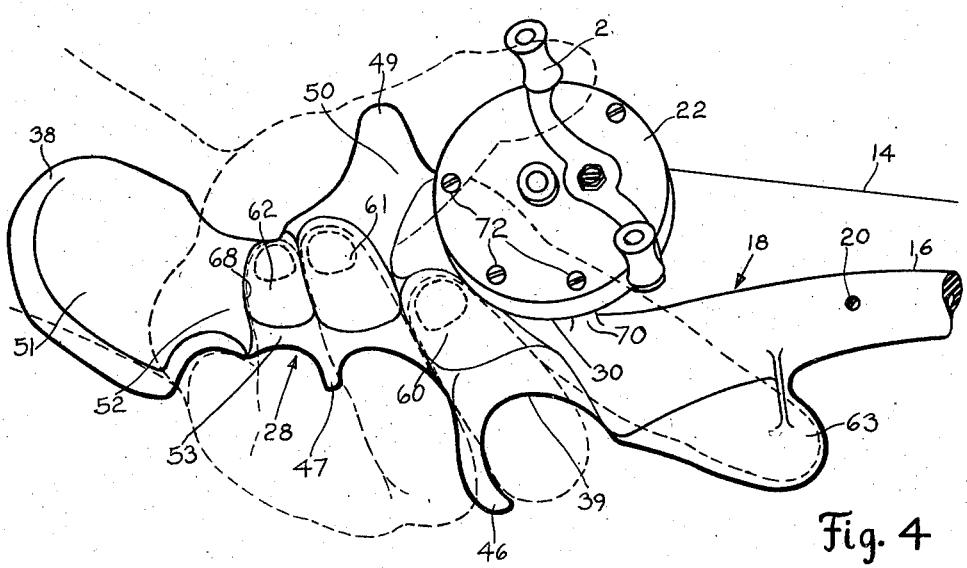
Fig. 4 is a view similar to Fig. 3, but with the left hand shown in natural holding position upon the handle.

The handle contour specific to the left hand, includes as shown in Figs. 3, 4 and 7 finger tip seat portions 60, 61 and 62 adapted to be engaged by the first phalanges of the second, third and little fingers respectively of the left hand when the fingers are curved naturally in clasping or holding the handle. An offset portion 63 located substantially in front of and somewhat below the reel seat, provides a seat portion 64 adapted to be engaged by at least one of the phalanges of the left index finger, which, when so placed is effectively located for applying torque to the rod when desired. While the torque receiving pad 64 is shown as long enough to receive the first two phalanges of the index finger, it need be long enough to receive but one, or part of one, and preferably the first phalange. The thumb placement guard 49 also acts as a torque applying pad for either thumb, and provides a curved surface 65 acting as a thumb rest for the left thumb, in that it supports the second phalange of the left hand thumb, leaving the end portion free to flex into controlling engagement with the line or reel drum supporting the line. To provide a palm heel support for the left hand, the seat portion 42 flares outwardly at 66 to join the butt 38, and in so doing provides an area adapted to engage the heel portion of the left hand palm. The seat 35 rises abruptly at 67 defining the rear-most location for the right hand parts.

Numerous of the specified right hand placement portions, also contribute to perfecting the left hand holding relation, and in so contributing accentuate the control and sensitiveness of rod manipulation. Specifically of these, the finger lock 46 as respects the left hand, projects between the second and third fingers to partially surround an intermediate portion of the left, second finger. The right hand locking fin 47 that extends between the second and third fingers, here forms a left hand palm support or lock that is pressed into the palm and extends from between the juncture of the fourth and little fingers substantially diagonally across the palm to a point near the base of the thumb. It thereby forms a non-slip engagement between the hand and grip and aids the finger lock 46 in assuring retention of the rod when a strike is made, even though the rodster has an unduly relaxed hold upon the handle.

The position of the left hand in natural closed relation upon the handle is shown in Figs. 4 and 7, where the hand parts are depicted by dotted lines, and where it will be seen that the thumb rests upon the guard 49 with the thumb tip in contactable relation with the reel or line, while the left index finger is extended substantially along the reel seat to a point beyond or in front of the reel and to one side of the axis of the handle where it engages the seat portion 64. The second finger is wrapped around the grip portion in front of the finger lock 46, and has its tip seated at 60 at the rear end of the reel seat. The two weakest members of the left hand, the fourth and little fingers, are as in the instance of the right hand, closely positioned so as to combine their holding forces and apply them as a single force at a point of greatest effect. That comprehends the adjacent seat portions 61 and 62, the latter of which rises abruptly on the butt side at 68 to interrupt the right hand center palm support 52, thereby defining the rear-most location for the left hand parts.

The position of the right hand in natural closed relation upon the handle is shown in Fig. 2, where the hand parts are depicted by dot-and-dash lines and where it will be seen that the right hand thumb is supported by the placement guard 49 so that the end of the thumb is freely engageable with the reel drum or line, while the index finger is substantially wrapped around the grip portion in front of the retainer or finger lock 46 to engage the tip seat 32. The second finger is also wrapped around the grip portion to engage the seats 43, 40 and 33, but is separated from the index finger by the finger lock 46, and also from the third and fourth fingers by the fin 47. The two smallest members are seated at 34 and 35 respectively near the butt of the grip.

A particular feature of the rod-handle is that a secure, and substantially complete holding engagement is obtained, though but an unduly relaxed hold may be had upon the grip portion, or though but part of the hand parts are actually in the designated positions. That is to say, a very secure hold of the rod is had, though the two smallest fingers may be entirely disengaged from the grip portion. This means that the rod may be held with security between the thumb and first two fingers of either hand, though they are not in a state of tight muscular strain. That feature affords considerable advantage in those manipulations of the rod that essentially call into play a flexing wrist. When a back stroke is made preparatory to the cast, it is a general rule for the rodster to arrest the rod suddenly, just after it reaches the vertical position or a little more. When a rod is equipped with my handle, the back stroke of the cast may be made with a comparatively loose hold upon the handle, in which instance an effective sudden stopping of the back stroke of the rod is accomplished simply by clasping the hand more tightly about the grip member just as the upward end of the wrist movement is reached. That tends to pivot the rod about a point within that part of the handle enclosed by the thumb and first two fingers.

In so doing the tip of the rod follows through and flexes in the opposite direction. With the casting hand in the tighter clasped relation on the grip, it is sensitive to the slightest movement of the rod tip, and when the reverse flexing of the rod is felt, it is in full control to begin on the more forceful foreward stroke of the cast. In this foreward stroke, the two small fingers apply their components of force near the butt of the handle to maintain the faces 51 or 66 in engagement with the heel of the palm which acts like a fulcrum while the fore part of the hand is delivering the rod pushing force. If the cast is being made with the right hand, this pushing force may be accomplished by the thumb resting at 50 and the index finger at 32, 39 and 60, while the foreward stroke by the left hand results in a push by the hand parts at 65 for the thumb, and at 64 and 32 for the index finger. In either case, the forces of the two smallest fingers of each hand are combined into a single pulling force opposing the pushing force which accomplishes a pivoting of the rod assembly at a point within the enclosed handle in the region of the thumb and index fingers. While there has been described but a single example of the complete control that the rodster has of the equipment during one of the many functions to which a rod may be put, every other function of the rod is capable of manipulation with complete control, and with a minimum of fatigue. Regardless of the fact that the rodster may be making any one of the several styles of casts, retrieving his line and bait, striking, playing his catch, or simply tournament casting, his rod holding hand is always clasped naturally on the rod handle, and may be under relaxed tension without incurring the danger of loss of rod, and without material lessening of sensitivity to that taking place at the end of his line.

The fishing rod equipped with my improved handle may be held and controlled with equal facility by either the right or left hand, and thus is adapted to satisfy the most rigid demands or desires of the fisherman, whether he be naturally right handed or left handed. Cognizance has been taken of the fact that all fishermen have a tendency to change the rod from one hand to the other, and the contour of the handle has been so designed as to facilitate that change though it be done at some point in the cycle of casting and retrieving the bait. Frequently the fisherman makes his cast with one hand, and then changes the rod to the other hand as soon as the bait is set down. By the particular location and shaping of the hand locating parts 32, 50, 64 and 65, the rodster is enabled to obtain a secure grip upon the handle with one hand before the other hand is removed, or even before the other hand is relaxed sufficiently to deprive it of a secure grip. As an illustration, assume that the right hand is completely seated upon the grip as shown in Fig. 2, and that it is desired to shift the rod to the left hand. Before any relaxation of the right hand is permitted, the left hand is brought to the handle with the thumb resting in place on 65 and the index finger on the part 64. The left second finger is curved about the grip member in front of the locking fin 46 and substantially on top of the right index finger. Thence removal of the right index and second finger will permit of the complete clasping of the grip member by the second and third fingers of the left hand. As hereinabove stated, a complete non-dispossessing hold of the handle is had by either hand when only the thumb and first two fingers are in position. Thus it will be seen that the secure holding relation of one hand is not given up until a like secure holding relation is acquired by the other hand. In some instances, it may be desirable after placing the thumb and fingers of the left hand, to then uncoil the ring and little fingers of the right hand before releasing the right hand thumb, index and second finger. This makes it possible to seat the left little finger and part of the left ring finger before the secure holding relation of the right hand is given up. A similar procedure is followed in changing the rod from the left hand to the right. With equal facility, the rod may be passed from the one hand of one person to the other hand of another person, with assurance that the other person will have a secure and completely controlled grasp of the equipment.

I have found that in constructing a handle in accordance with this disclosure, that it can be successfully accomplished by casting or molding in finished form in a simple two part mold. Though the handle appears to be complicated as to contours and extensions, I have successfully cast a handle in a simple mold fixture. This is possible by reason of the design providing a parting line extending the length of the handle, and situated on substantially opposite sides. The mold parts include in addition to the handle parts already referred to, provisions for establishing the reel seat 30. Appropriate cavities are formed in the mold parts to provide turrets or bosses 70 that extend laterally and in opposite directions from the handle, to receive attaching screws 72 by which the head members of the reel are secured to the handle. In lieu of the bosses 70 the screws 72 may thread into lugs or extended portions of the grip member adjacent the finger and thumb placement portions as at 73.

In forming my improved casting rod handle, I prefer it to be of integral or monolithic construction, fabricated from any one, or combination of, the many die molded metals or plastics, though satisfactory handles have been cast from metals of the lighter order. On the other hand, I may form the handle from natural fibers, or even from wood conservation products or scrap cellulose material, with an appropriate binder.

While the embodiment of the present invention as herein disclosed, constitutes a preferred form, it is to be understood that other forms might be adopted, all coming within the scope of the claims which follow.

What is claimed is as follows:

1. A fishing rod handle, designed and constructed to fit naturally both the right and left hand when either is closed about the handle, comprising in combination, a reel seat, a grip portion extending to the rear of said reel seat, said grip portion providing recesses adapted to seat the finger tips of the hand grasping the handle, a locking fin adapted to engage between two adjacent fingers, a thumb rest adapted to support either thumb in contactable relation with an attached reel, and a heel member adapted to engage the rear palm portion of either hand.

2. A fishing rod handle, designed and constructed to fit naturally both the right and left hand when either is closed about the handle, comprising in combination, a reel seat, a grip portion extending to the rear of said reel seat, and providing a series of concave facets adapted to be engaged by the first phalanges of the fingers of the right hand, and a second series of concave facets adapted to be engaged by the first phalanges of the fingers of the left hand, means including parts extending from the grip portion tending to distribute the clasping force of the two larger fingers of each hand, means tending to confine the clasping force of the two smallest fingers of each hand to a relatively small area, and means adapted to support the second phalanges of either thumb, so that the tip of the thumb will be engageable with a reel mounted on the reel seat.

3. A handle for a fishing rod, comprising in combination, a single handed grip member contoured to fit naturally against a maximum area of both the right and left hand when either is closed about the handle, said grip member providing a rest portion adapted to support the second phalange of either thumb, and a finger lock adapted to extend between the adjacent fingers of the middle three.

4. In a manually operated device, a form fitting handle adapted to be grasped by either hand, comprising in combination, an elongated body of irregular formation having a plurality of recesses, some of which are separated by lug portions, means including a horn supported by the body adapted to support the second phalange of either thumb, means including one of said lugs providing a finger lock against accidental dispossession of the device, means including another of said lugs providing an anchoring fin adapted to engage between two of the fingers of one hand, and extend substantially across the palm of the other hand, and means at the end of the body adapted to engage the heel of either hand.

5. In a manually operated device, a form fitting handle adapted to be grasped by either hand, comprising in combination, an elongated body of irregular formation having a series of concave facets on one side adapted to position the first phalanges of the right hand, and a second series of concave facets substantially on the opposite side adapted to position the first phalanges of the left hand, a curved lug extending from the body and adapted to extend partly around the second phalanges of one of the fingers of either hand holding the device, and means including a lug extending from between two adjacent ones of said facets adapted to engage the palm center of one hand.

6. In a manually operated device a form fitting handle adapted to be grasped by either hand, comprising in combination, an elongated body of irregular formation having a series of concave facets on one side adapted to position the first phalanges of the right hand, and a second series of concave facets substantially on the opposite side adapted to position the first phalanges of the left hand, one of said facets being segregated from the others and adapted to receive the index finger of one hand when extended substantially along the device, and means including a lug extending from between adjacent facets localizing the gripping force of the two smallest fingers of either hand, by which the device is held.

7. A fishing rod handle fashioned to fit the natural contour of the closed hand, and adapted to be shifted to either hand of the fisherman at his option, where it fits in nesting relation with substantially equal comfort and engaging area, comprising in combination, a rigid casting adapted to support a fishing rod, and a line reel, said casting providing a grip member posterior to the line reel, and having recessed portions for seating certain high points of the palm and fingers of the clasping hand, and having ridge portions for seating in selected depressed portions of the palm of the hand, means including extensions from the casting distributing the grasping force of the thumb and two largest fingers, and means including a rest disposed adjacent the reel adapted to support either thumb so that the tip thereof is in controlling relation with the line reel.

8. A fishing rod handle comprising in combination a part adapted at one end for attachment to a fishing rod and for mounting a line reel, and a grip portion posterior to the reel mounting contoured to fit either hand of the user when clasped in a natural holding relation thereon, said grip contour providing seats for the finger tips of the right hand and other seats for the finger tips of the left hand, one of said finger seats adapted to receive the index finger of one hand when extended along and beneath the reel seat.

9. A handle fashioned to be held in either hand of the user and substantially fit the irregular contour of either hand in its natural holding relation, comprising in combination, a grip portion having provisions for locating the thumb and fingers of either hand in its natural closed position about the handle, said provisions comprising alternate recesses and lugs for localizing the forces of the thumb, first and second fingers at a point in the handle, and adjacent recesses near the butt of the grip for combining the forces of the ring and little finger at a point remote from the first mentioned point.

10. In a fishing rod, a handle contoured to provide ambidexter manipulation and control of the rod at all times, comprising in combination, a grip portion providing seats for the finger tips of either hand in their natural closed relation thereon, means including a lateral extension from the grip portion adapted to be disposed between the second and third fingers of the right hand, and adapted to extend across the palm of the left hand, and means including an enlarged butt at the end of the grip portion, adapted to pivot the rod at the heel of either palm.

11. In a fishing rod, a handle contoured to provide ambidexter manipulation and control of the rod at all times, comprising in combination, a grip portion having provisions for definitely and naturally positioning the fingers and thumb of either hand, at the option of the user, said provisions including lateral extensions of the grip adapted to receive torque applying forces administered by certain of the hand parts, one of said extensions adapted to be engaged by the second phalange of either thumb, and another of said extensions adapted to be engaged by at least one phalange of the left index finger.

12. In a fishing rod, a handle contoured to provide ambidexter manipulation and control of the rod at all times, comprising in combination, a grip portion providing seats for the finger and palm portions of either hand when in natural clasping relation about the handle, some of the seats for one hand being common to the seats for the other hand, and means including a lateral extension providing a finger lock adapted to engage between the first and second fingers of the one hand, and between the second and third fingers of the other hand, depending upon the hand by which the handle is grasped.

13. In a fishing rod, a handle contoured to provide ambidexter manipulation and control of the rod at all times, comprising in combination, a grip portion providing seats for the finger and palm portions of either hand, said seats including placement portions for the ends of all the fingers, placement portions for the second and third phalanges for the fingers of one hand, some of the placements for the second phalanges of one hand constituting placement portions for the second phalanges of the other hand, and certain of the placement portions for the finger ends, adapted to engage portions of the fingers and palm of the other hand.

14. In a manually operated device, a handle contoured to provide ambidexter manipulation and control of an implement attached thereto comprising in combination, a grip portion having peripherally extending shallow grooves adapted to locate each a finger in its curved condition, finger locks including lugs extending from between certain of the adjacent grooves, certain of the grooves adapted to seat different fingers of each hand, and a horn interrupting one of the grooves and upstanding from the grip portion for engaging the thumb of either hand, said grooves and finger locks facilitating transfer of the handle from one holding hand to another holding hand, whereby a secure holding by the said another holding hand is accomplished before the secure holding by the said one holding hand is released.

WILLIAM G. PONTIS.